United States Patent
Su et al.

(10) Patent No.: US 12,269,685 B2
(45) Date of Patent: Apr. 8, 2025

(54) VENDING METHOD OF INTELLIGENT VENDING STATION, INTELLIGENT VENDING STATION, ELECTRONIC DEVICE AND STORAGE MEDIUM

(71) Applicants: SHANDONG NEW BEIYANG INFORMATION TECHNOLOGY CO., LTD., Shandong (CN); WEIHAI NEW BEIYANG DIGITAL TECHNOLOGY CO., LTD., Shandong (CN)

(72) Inventors: Changqing Su, Shandong (CN); Xiangwei Chen, Shandong (CN); Xuqiang Dong, Shandong (CN); Zhigang Xu, Shandong (CN); Chuntao Wang, Shandong (CN)

(73) Assignees: SHANDONG NEW BEIYANG INFORMATION TECHNOLOGY CO., LTD., Shandong (CN); WEIHAI NEW BEIYANG DIGITAL TECHNOLOGY CO., LTD., Shandong (CN)

( * ) Notice: Subject to any disclaimer, the term of this patent is extended or adjusted under 35 U.S.C. 154(b) by 1022 days.

(21) Appl. No.: 17/287,572

(22) PCT Filed: Sep. 27, 2019

(86) PCT No.: PCT/CN2019/108727
§ 371 (c)(1),
(2) Date: Apr. 22, 2021

(87) PCT Pub. No.: WO2020/082991
PCT Pub. Date: Apr. 30, 2020

(65) Prior Publication Data
US 2021/0395009 A1 Dec. 23, 2021

(30) Foreign Application Priority Data

Oct. 26, 2018 (CN) .......................... 201811258853.X

(51) Int. Cl.
*B65G 1/137* (2006.01)
*G05B 13/02* (2006.01)
(Continued)

(52) U.S. Cl.
CPC .......... *B65G 1/137* (2013.01); *G05B 13/0265* (2013.01); *G06Q 20/18* (2013.01); *G07F 11/58* (2013.01)

(58) Field of Classification Search
CPC .... B65G 1/137; B65G 1/1373; B65G 1/0407; B65G 1/1375; B65G 1/1378;
(Continued)

(56) References Cited

U.S. PATENT DOCUMENTS 5,588,790 A * 12/1996 Lichti .................... B65G 1/133
700/130
10,357,804 B2 * 7/2019 Must ...................... B65G 1/137
(Continued)

FOREIGN PATENT DOCUMENTS

CN 102906772 A 1/2013
CN 205837747 U 12/2016
(Continued)

OTHER PUBLICATIONS

First Search of Chinese Prior Application No. 201811258853X, pp. 1-2.
(Continued)

*Primary Examiner* — Michael Collins
(74) *Attorney, Agent, or Firm* — George Likourezos; Carter, DeLuca & Farrell LLP

(57) ABSTRACT

Disclosed are a vending method of an intelligent vending station, an intelligent vending station, an electronic device,
(Continued)

and a storage medium. The method comprises the following steps of: determining a target item and a target vending device according to a purchase instruction from a user; determining a target cabinet accommodating the target item and determining a target conveying device; controlling the target conveying device to acquire the target item from the target cabinet and to convey the acquired target item to a receiving area of the target vending device.

14 Claims, 7 Drawing Sheets

(51) Int. Cl.
  *G06Q 20/18* (2012.01)
  *G07F 11/58* (2006.01)
(58) Field of Classification Search
  CPC .... G05B 13/0265; G06Q 20/18; G06Q 10/08; G06Q 10/083; G07F 11/58; G07F 9/002; G07F 9/006; G07F 11/16; G07F 11/00
  See application file for complete search history.

(56) References Cited

U.S. PATENT DOCUMENTS

| | | | | |
|---|---|---|---|---|
| 10,543,942 | B2* | 1/2020 | Almogy | B65B 43/58 |
| 11,138,544 | B2* | 10/2021 | Kütt | B65G 1/0407 |
| 2003/0029882 | A1* | 2/2003 | Yuyama | B65B 21/12 |
| | | | | 221/210 |
| 2018/0304311 | A1* | 10/2018 | Must | B07C 3/087 |
| 2019/0152634 | A1* | 5/2019 | Almogy | B65G 65/425 |

FOREIGN PATENT DOCUMENTS

| | | |
|---|---|---|
| CN | 206179091 U | 5/2017 |
| CN | 107103692 A | 8/2017 |
| CN | 107195096 A | 9/2017 |
| CN | 107564209 A | 1/2018 |
| CN | 107945378 A | 4/2018 |
| CN | 108100548 A | 6/2018 |
| CN | 108133545 A | 6/2018 |
| CN | 108564444 A | 9/2018 |
| EP | 1522507 A1 | 4/2005 |

OTHER PUBLICATIONS

International Search Report issued by the China National Intellectual Property Administration (ISA/CN) in connection to International Application No. PCT/CN2019/108727, dated Dec. 27, 2019, pp. 1-2, English translation.
First Office Action of Chinese Prior Application No. 201811258853.X, dated Oct. 29, 2020, pp. 1-8.
Second Office Action of Chinese Prior Application No. 201811258853.X, dated Apr. 15, 2021, pp. 1-10.

* cited by examiner

VENDING METHOD OF INTELLIGENT VENDING STATION, INTELLIGENT VENDING STATION, ELECTRONIC DEVICE AND STORAGE MEDIUM

The present disclosure is a U.S National Stage Application of PCT Application Serial No. PCT/CN2019/108727, filed Sep. 27, 2019, which claims priority to Chinese Patent Application No. 201811258853.X filed Oct. 26, 2018 with the CNIPA, the disclosures of which are incorporated herein by reference in their entireties.

TECHNICAL FIELD

The present disclosure relates to the technical field of vending, for example to a vending method of an intelligent vending station, an intelligent vending station, an electronic device, and a storage medium.

BACKGROUND

Vending machines with a vending function are provided in related technologies. However, due to the limitation of cabinet size thereof, the types and quantities of items sold by the vending machines are limited, so vending machines are often unable to meet people's shopping needs. In daily life, people often need to go shopping in supermarkets but spend a long time doing so in most cases as they have to turn round and round between multiple cabinets to select items to be purchased, and to bring the selected items to a cashier for checkout after bar-code scanning.

SUMMARY

The present disclosure provides a vending method of an intelligent vending station, an intelligent vending station, an electronic device and a storage medium, to improve the problem that users spend a long time turning round and round between multiple cabinets when shopping in supermarkets.

Embodiments of the present disclosure are achieved in the manners described below:

Provided is a vending method of an intelligent vending station. The intelligent vending station includes an enclosure, and a plurality of cabinets and at least one conveying device which are provided within the enclosure. Each cabinet is configured to accommodate items. At least one vending device, having a pickup port provided on an outer wall of the enclosure and a receiving area provided on an inner wall of the enclosure, is provided on the enclosure, and the receiving area is connected with the pickup port. Each conveying device is configured to move within the enclosure. The vending method of the intelligent vending station includes the following steps of:

determining a target item and a target vending device according to a purchase instruction from a user;

determining a target cabinet accommodating the target item and determining a target conveying device; and controlling the target conveying device to acquire the target item from the target cabinet and to convey the acquired target item to the receiving area of the target vending device.

Provided is an intelligent vending station, including a control device, an enclosure, as well as a plurality of cabinets and at least one conveying device which are provided within the enclosure. Each cabinet is configured to accommodate items. At least one vending device, having a pickup port provided on an outer wall of the enclosure and a receiving area provided on an inner wall of the enclosure, is provided on the enclosure, and the receiving area is connected with the pickup port. Each conveying device is configured to move within the enclosure and electrically connected with the control device. The control device is configured to:

determine a target item and a target vending device according to a purchase instruction from a user, determine a target cabinet accommodating the target item and determine a target conveying device, and control the target conveying device to acquire the target item from the target cabinet and to convey the acquired target item to the receiving area of the target vending device.

Provided is an electronic device, including:

at least one processor, and a memory configured to store at least one program, the at least one program is executed by the at least one processor, enabling at least one processor to implement the above method.

Provided is a computer-readable storage medium storing computer-executable instructions for performing the above method.

BRIEF DESCRIPTION OF DRAWINGS

The drawings used in the description of the embodiments will be briefly described below. It is to be understood that the subsequent drawings only illustrate part of embodiments of the present disclosure, and therefore should not be construed as limiting the scope. Those of ordinary skill in the art may obtain other drawings based on the drawings described below on the premise that no creative work is done.

Figure 1:
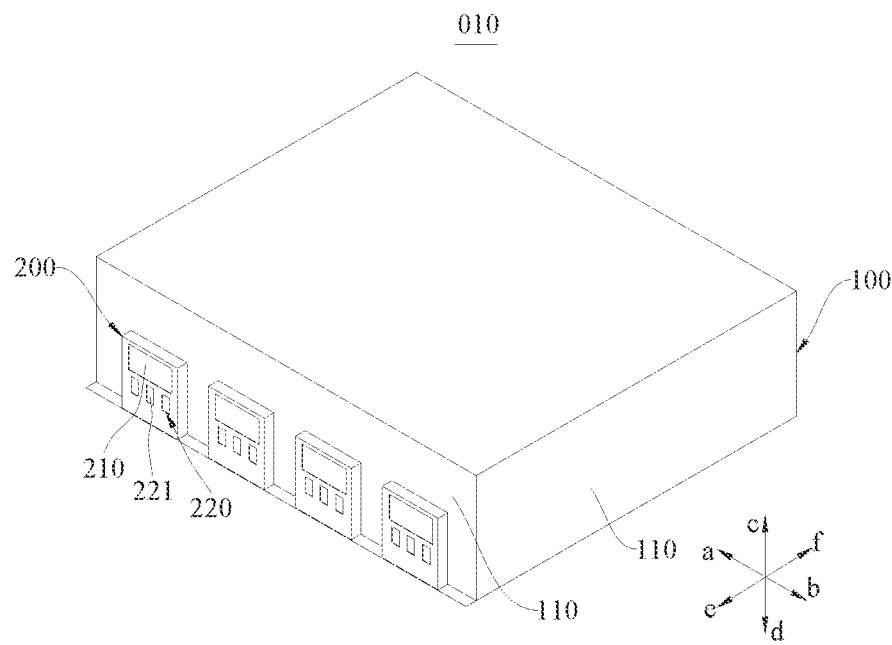
FIG. 1 is a structural schematic view of an intelligent vending station according to an embodiment of the present disclosure.

In the figure: 010—intelligent vending station; 100—enclosure; 110—wall; 200—vending device; 210—human-computer interaction device; 220—pickup port; 221—gate; 230—receiving area; 231—receiving platform; 300—cabinet; 310—cabinet body; 320—storage area; 321—item column; 322—push plate; 323—push plate transmission assembly; 330—hopper; 331—box body; 332—receiving bin; 333—push plate driving mechanism; 334—vertical girder; 335—bottom plate; 336—inlet; 340—circulation area; 342—circulating box; 400—conveying device; 410—chassis; 420—support frame; 430—pickup platform; 432—fork; 440—temporary storage area shelf; 442—pusher; 510—processor; 520—memory; 530—input device; 540—output device.

DETAILED DESCRIPTION

The solutions in embodiments of the present disclosure will be clearly and completely described in conjunction with the drawings in the embodiments of the present disclosure. Apparently, the embodiments described below are part, not all, of the embodiments of the present disclosure. Generally, the components in the embodiments of the present disclosure described and illustrated in the drawings herein may be arranged and designed through various configurations.

Therefore, the following detailed description of the embodiments of the present disclosure shown in the drawings is not intended to limit the scope of the present disclosure, but merely illustrates the selected embodiments of the present disclosure. Based on the embodiments described herein, all other embodiments obtained by those of ordinary skill in the art without creative work are within the scope of the present disclosure.

It is to be noted that similar reference numerals and letters indicate similar items in the subsequent drawings, and therefore, once a particular item is defined in one drawing, the item needs no more definition and explanation in subsequent drawings.

In the description of the embodiments of the present disclosure, it is to be noted that the orientational or positional relationships indicated by terms "above", "below", "left", "right", "vertical", "horizontal", "inside", "outside" and the like are based on the orientational or positional relationships illustrated in the drawings or the orientational or positional relationship that products of the present disclosure are usually used in, which are for the mere purpose of facilitating and simplifying the description of the present disclosure and do not indicate or imply that the device or element referred to has a specific orientation and is constructed and operated in a specific orientation, and thus it is not to be construed as limiting the present disclosure.

Besides, the terms "horizontal", "vertical" and the like do not mean that the components are required to be absolutely horizontal or overhanging, but may be slightly inclined. For example, "horizontal" only means that its direction is more horizontal than "vertical", which does not mean that the structure must be completely horizontal, but may be slightly inclined It needs to be noted in the description of the embodiment that unless otherwise specified or restricted, the words of "setting", "installation", "interconnection" and "connection" shall be understood as a general sense. For example, the connection can be fixed connection, removable connection, integrated connection, direct connection, indirect connection through intermediate media or connection between two components. Persons of ordinary skill in the art of the present disclosure can understand the specific meanings of the terms above in the embodiment as the case may be.

According to embodiments of the present disclosure, a vending method of an intelligent vending station and an intelligent vending station are provided, and the intelligent vending station will be first described in detail.

Figure 2:
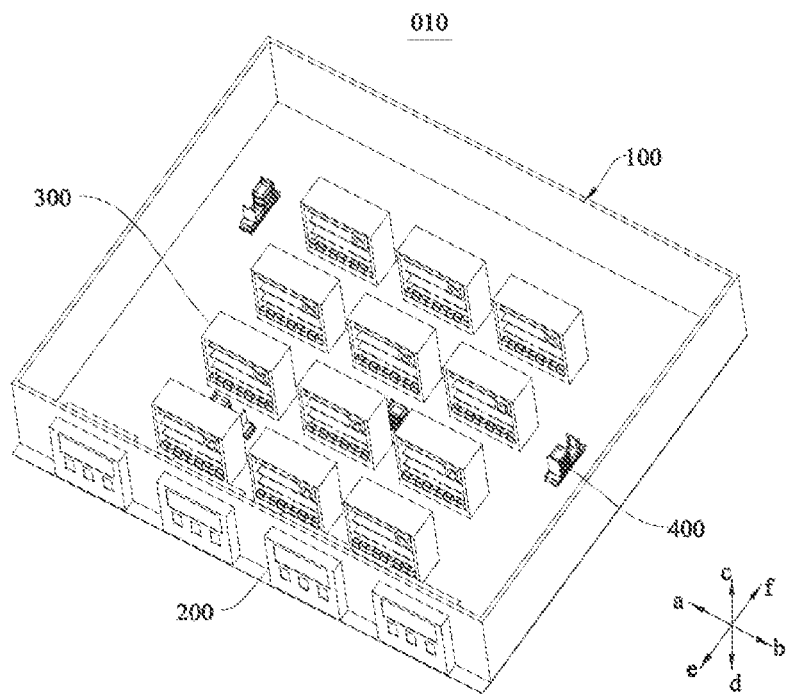
FIG. 2 is a structural schematic view illustrating the interior of the intelligent vending station viewed from a first angle according to an embodiment of the present disclosure.
Figure 3:
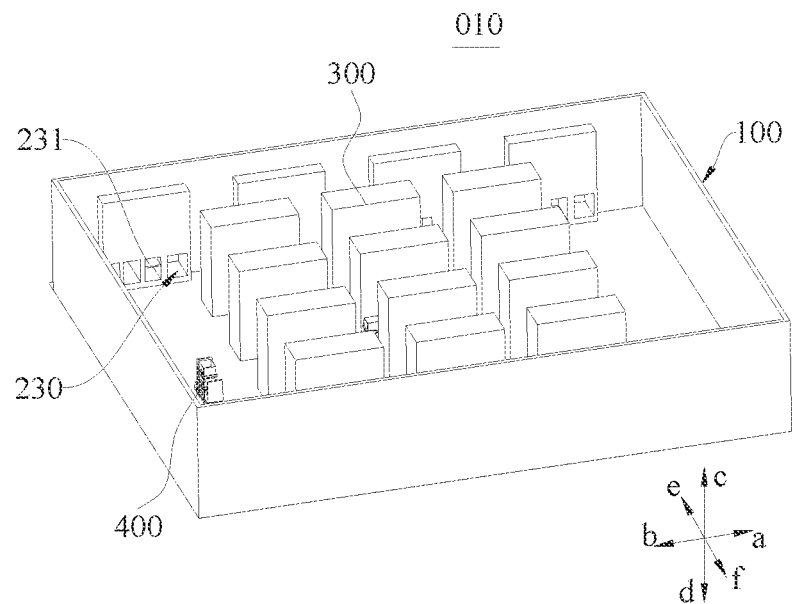
FIG. 3 is a structural schematic view illustrating the interior of the intelligent vending station viewed from a second angle according to an embodiment of the present disclosure.

FIG. 1 is a structural schematic view of the intelligent vending station according to an embodiment of the present disclosure, and FIGS. 2 and 3 are structural schematic views illustrating the interior of the intelligent vending station viewed from two angles according to an embodiment of the present disclosure. Referring to FIGS. 1 to 3, the intelligent vending station 010 includes a control device and an enclosure 100. A plurality of cabinets 300 and at least one conveying device 400 are provided within the enclosure 100, and at least one vending device 200 is provided on the enclosure 100.

In this embodiment, the enclosure 100 includes four walls 110 which are connected end to end in sequence. The walls 110 may be made of concrete, galvanized steel board and other materials, and may also be made of transparent glass or provided with transparent glass windows for displaying items within the enclosure 100. In one or more embodiments, the intelligent vending station 010 further includes a foundation bed and a ceiling which are arranged opposite each other and also apart and parallel to each other, the four walls 110 are connected end to end in sequence between the foundation bed and the ceiling, and the four walls 110 as well as the foundation bed and the ceiling form an enclosed house. With the enclosed house, the capability of the intelligent vending station 010 for guarding against dust, wind, rain and theft can be improved.

The vending device 200 includes a human-computer interaction device 210, a pickup port 220, and a gate 221 configured to close or open the pickup port 220 which are provided on an outer wall of the enclosure 100, and a receiving area 230 provided on an inner wall of the enclosure 100. The receiving area 230 is connected with the pickup port 220, and when the pickup port 220 is open, a user may take items in the receiving area 230 out through the pickup port 220 on the outer side of the enclosure 100. The user may select an item and input a purchase instruction through the human-computer interaction device 210 of one vending device 200 (i.e., the target vending device described hereinafter), and the control device controls the conveying device 400 to acquire a target item from the cabinet 300 accommodating items (i.e., the target item described hereinafter) to be purchased by the user and conveys the target item to the receiving area 230 of the target vending device 200 for the user to take the target item in the receiving area 230 out through the pickup port 220. In other embodiments provided in the present disclosure, the user may also select an item and input a purchase instruction through a mobile terminal, and the mobile terminal transmits the purchase instruction input by the user to the control device through communication means such as network and Bluetooth. In one or more embodiments, in this case, the user may designate one target vending device 200 through the mobile terminal and take the target item out through the pickup port 220 of the target vending device 200.

In this embodiment, the four vending devices 200 are horizontally spaced on one of the walls 110. Each vending device 200 may include one or more pickup ports 220, each pickup port 220 is provided with a gate 221 configured to open or close the corresponding pickup port 220, and each pickup port 220 is connected with the receiving area 230 running through an inner side of the wall 110 to link up all parts of the area within the enclosure 100, so that the items within the enclosure 100 may be conveyed to the receiving area 230 for the user to take the item out. As shown in FIG. 1, in this embodiment, each vending device 200 includes three pickup ports 220.

In an embodiment, a receiving platform 231 capable of moving in a vertical direction and a receiving platform driving mechanism configured to drive the receiving platform 231 to move are provided in the receiving area 230. The receiving platform 231 may be located at a receiving position or at a dispensing position. In this embodiment, when the receiving platform 231 is located at the receiving position, it is located below the pickup port 220 and is configured to receive the item conveyed by the conveying device 400. When the receiving platform 231 is located at the dispensing position, the receiving platform 231 is flush with the pickup port 220 and close to the pickup port 220, so that the user can take the item on the receiving platform 231 out through the pickup port 220. Since the receiving platform 231 is provided in the receiving area 230, the intelligent vending station 010 can lift the item up to a position where the pickup port 220 is located through the receiving platform 231 during a normal dispensing operation, making it easy for the user to take the item out. Meanwhile, the intelligent vending station 010 can position the receiving platform 231 at the receiving position when the normal dispensing operation is not performed, so that even if the gate 221 is open, it is hard for the user outside the intelligent vending station 010 to take the item on the receiving platform 231 out, thus improving the security of the vending operations. Moreover, since the receiving platform 231 is provided, the user can take the item out without bending down, making pickup operations convenient and fast and the user experience better. In addition, the receiving platform 231 may also convey a plurality of items purchased by the user simultaneously to the pickup port 220 for the user to take the items out at one time, which can avoid the user from taking out the items multiple times, effectively improve the dispensing efficiency of the intelligent vending station 010, save the dispensing time and improve the user experience.

In this embodiment, the human-computer interaction device 210 is configured to display information about items for sale in the intelligent vending station 010 to the user and to receive the purchase instruction from the user. The human-computer interaction device 210 may include a touch screen, a scanner, a keyboard, a card reader, etc.

In this embodiment, a plurality of cabinets 300 are provided within the enclosure 100. The cabinets 300 are arranged in A rows and B columns in the storage space within the enclosure 100. The cabinets 300 provided in the intelligent vending station 010 may improve the variety of items for sale and ensure the sufficiency of items for sale.

Figure 4:
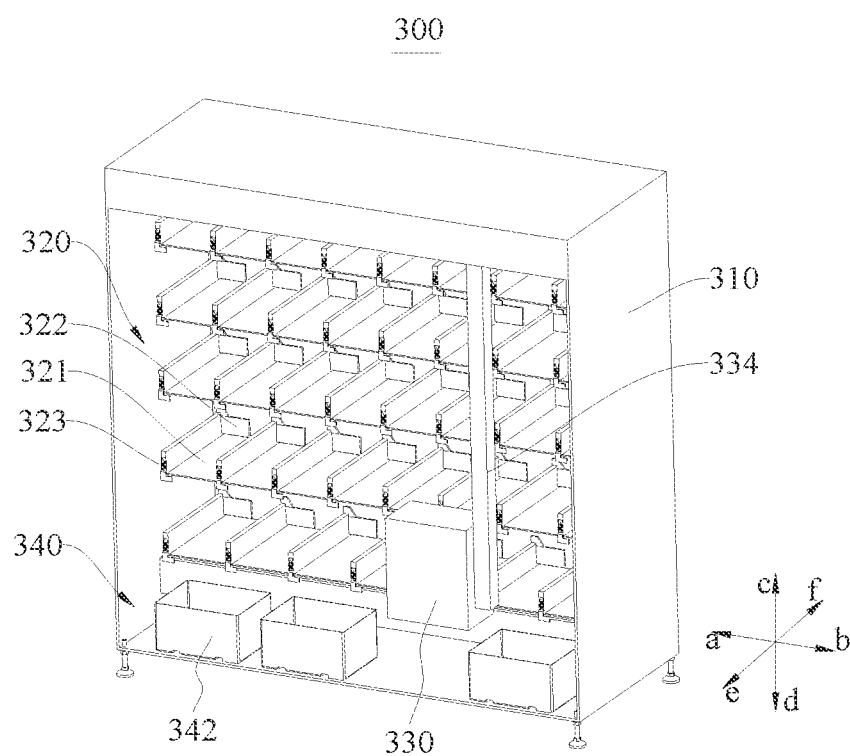
FIG. 4 is a structural schematic view of a cabinet according to an embodiment of the present disclosure.

FIG. 4 is a structural schematic view of the cabinet according to an embodiment of the present disclosure. Referring to FIG. 4, the cabinet 300 includes a cabinet body 310 provided with a storage area 320 and a circulation area 340. A plurality of item columns 321 are arranged in M layers up and down (i.e., the directions indicated by arrows cd) and in N columns left and right (i.e., the directions indicated by arrows ab) in the storage area 320, and the length direction of the item columns 321 extends in the forward and backward directions (i.e., the directions indicated by arrows ef). An outlet is provided at one end of the item column 321 and the cabinet body 310 is open on one side corresponding to the outlet of the item column 321. In this embodiment, the circulation area 340 of the cabinet body 310 is located at the bottom of the cabinet body 310. The items accommodated in the item column 321 can be conveyed to the circulation area 340.

In this embodiment, a conveying mechanism for conveying the items out of the item column 321 is provided in the item column 321. The conveying mechanism may include a push plate 322 and a push plate transmission assembly 323 in transmission connection with the push plate 322. When driven, the push plate transmission assembly 323 can drive the push plate 322 to move in the length direction of the item column 321. The push plate 322 is able to push the item out from the outlet of the item column 321 as it moves outwards. In this embodiment, a delivery device, which is located between the storage area 320 and the circulation area 340, is further provided in the cabinet body 310, and the item pushed out from the outlet of the item column 321 may be delivered by the delivery device to the circulation area 340. In other embodiments provided in the present disclosure, the item pushed out from the outlet of the item column 321 may also be dropped directly into the circulation area 340.

In this embodiment, the delivery device includes a vertical girder 334, a cross girder, a hopper 330 movably provided at the vertical girder 334, a vertical driving mechanism for driving the hopper 330 to move in a vertical direction relative to the vertical girder 334, and a horizontal driving mechanism for driving the vertical girder 334 to move in a horizontal direction relative to the cross girder. In this way, the hopper 330 may be driven to move up and down and/or left and right in a vertical plane, so that the hopper 330 is driven to move to the outlet of any of the item columns 321 to receive the item and then to the circulation area 340 to unload the item. As described above, in this embodiment, the circulation area 340 of the cabinet body 310 is located at the bottom of the cabinet body 310, so the hopper 330 can move to the bottom of the cabinet body 310 to unload the item.

Figure 5:
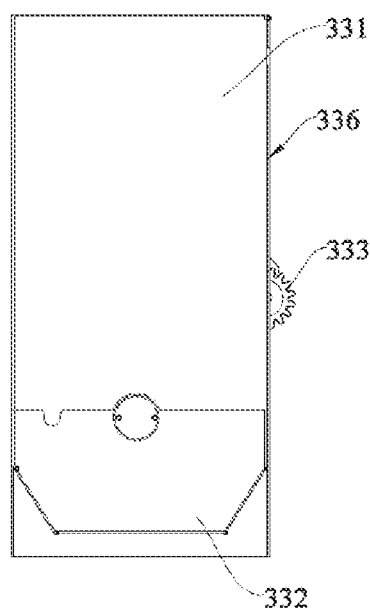
FIG. 5 is a structural schematic view of a hopper according to an embodiment of the present disclosure in the case where a receiving bin is not turned over.
Figure 6:
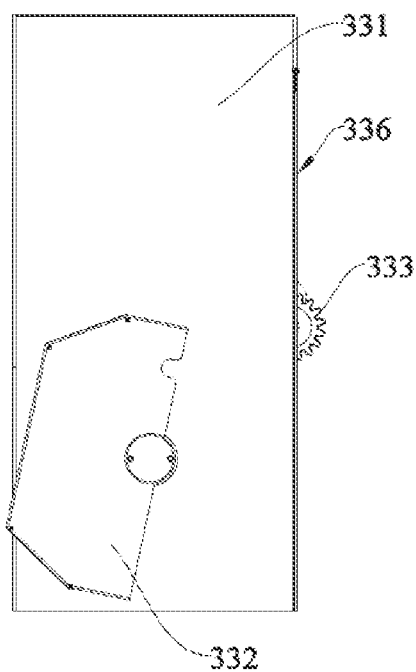
FIG. 6 is a structural schematic view of the hopper according to an embodiment of the present disclosure in the case where the receiving bin is turned over.

FIGS. 5 and 6 are structural schematic views of the hopper according to an embodiment of the present disclosure in the cases where a receiving bin is not turned over and turned over. Referring to FIGS. 5 and 6, the hopper 330 includes a box body 331 with an opening at the bottom, and a receiving bin 332 rotatably provided in the box body 331. An inlet 336, through which items enter the hopper 330, is provided on one side of the box body 331 facing toward the item column 321. The receiving bin 332 is configured to carry the item delivered from the item column 321, and can rotate under the driving of a receiving bin driving mechanism. When the receiving bin 332 is turned over, it can dump the item carried therein out from the bottom of the box body 331, so that the item can enter the circulation area 340 through the opening at the bottom of the box body 331.

Figure 7:
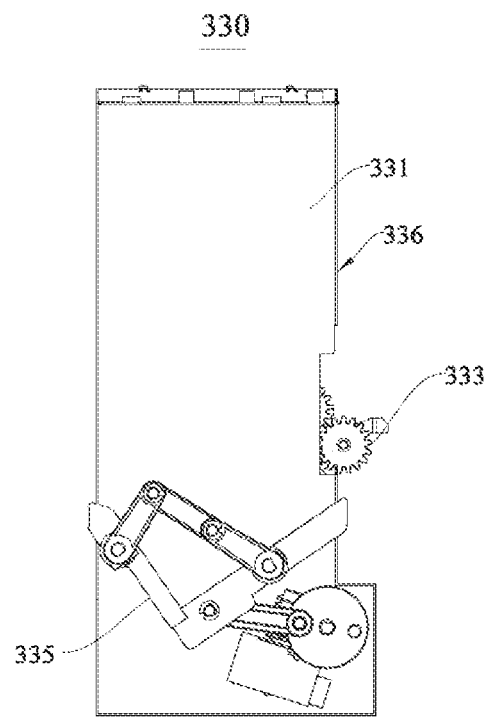
FIG. 7 is a structural schematic view of a hopper according to another embodiment of the present disclosure.

FIG. 7 is a structural schematic view of a hopper according to another embodiment of the present disclosure. As shown in FIG. 7, in another alternative embodiment of the present disclosure, a counter-opening bottom plate 335 consisting of two plates and a bottom plate driving mechanism configured to drive the bottom plate 335 to rotate, are provided in the box body 331. The bottom plate 335 is configured to carry items when the two plates are flush with each other. When there is a need to unload the item from the hopper 330, the bottom plate driving mechanism drives the two plates of the bottom plate 335 to turn over and open against each other, so that the item is dropped from the opening at the bottom of the box body 331.

Further in this embodiment of the present disclosure, a push plate driving mechanism 333 is provided on the hopper 330. The push plate driving mechanism 333 can cooperate with the push plate transmission assembly 323 on the item column 321 when the hopper 330 moves to a position where the outlet of the item column 321 is located, to provide a driving force to the push plate transmission assembly 323, which in turn drives the push plate 322 to move in the length direction of the item column 321 towards the outlet of the item column 321, thus delivering the item into the hopper 330 from the item column 321.

Referring further to FIG. 4, in an embodiment, it is difficult for the conveying device 400 to pick up all types of items directly from the circulation area 340 due to the different shapes and sizes of items. Therefore, in this embodiment, a plurality of circulating boxes 342, which are configured to receive items dropped from the bottom of the hopper 330 in the circulation area 340, are further provided in the cabinet body 310. The plurality of circulating boxes 342 may be provided in a structure of uniform shape and size for easy pickup by the conveying device 400. In this embodiment, the circulating box 342 is rectangular and with an upward opening. The circulating box 342 accommodating items may be conveyed together with the items by the conveying device 400 to the receiving area 230 of the vending device 200.

Figure 8:
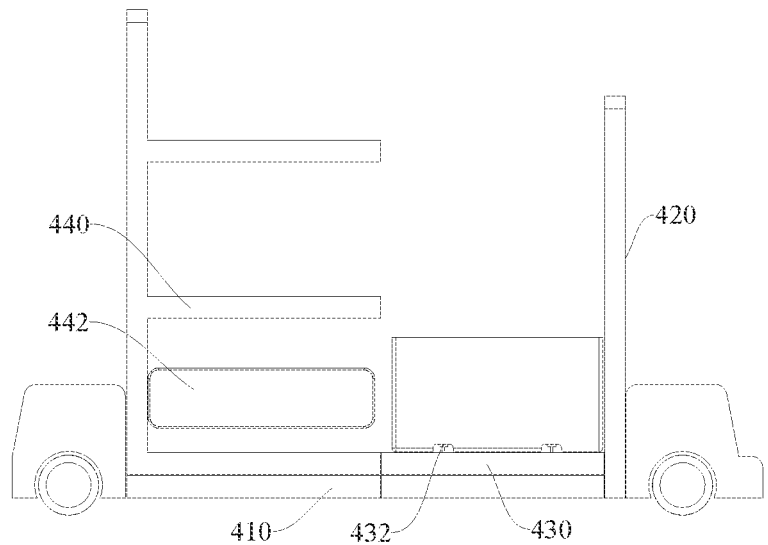
FIG. 8 is a structural schematic view of a conveying device according to an embodiment of the present disclosure.

In this embodiment, the conveying device 400 may be a robot or a conveying vehicle. FIG. 8 is a structural schematic view of a conveying device according to an embodiment of the present disclosure. Referring to FIG. 8, in this embodiment, the conveying device 400 is a conveying vehicle, which includes a chassis 410, as well as a support frame 420 and a pickup platform 430 provided on the chassis 410. The pickup platform 430 can be driven by a platform driving mechanism to move up and down along the support frame 420, and a fork 432, which can horizontally stretch out and draw back to pick up the circulating box 342, is provided on the pickup platform 430. A temporary storage area, in which a temporary storage area shelf 440 is provided, is further provided on the chassis 410 of the conveying vehicle, and the temporary storage area shelf 440 is configured to temporarily store items acquired by the conveying device 400 from the circulation area 340. In this embodiment, the temporary storage area shelf 440 is further provided with a pusher 442 and a pusher driving mechanism configured to drive the pusher 442 to move, and the pusher 442 can push the target item to the receiving area 230 as it moves. As shown in FIG. 8, the pusher 442 is provided at a bottom layer of the three-layer temporary storage area shelf 440, and the height of the bottom layer of the temporary storage area shelf 440 is roughly the same as that of the receiving area 230, thus making it easier for the target item to be pushed to the receiving area 230. In one or more embodiments, the conveying vehicle is an Automated Guided Vehicle (AGV), which can travel along a preset guided path, so as to realize the delivery of items.

In one or more embodiments of the present disclosure, a plurality of conveying passages, configured to connect the cabinets with each other and with the receiving area 230, are further provided within the enclosure 100. The conveying device 400 can travel in the conveying passages to convey items in the circulation area 340 of the cabinet 300 to the receiving area 230 of the vending device 200. In one or more embodiments, tracks connecting all cabinets 300 to the receiving area 230 are provided in the conveying passages.

In this embodiment, the control device is electrically connected to the human-computer interaction device 210, the horizontal driving mechanism, the vertical driving mechanism, the push plate driving mechanism 333, the receiving bin driving mechanism and the conveying device 400. The control device is configured to determine a target item and a target vending device 200 according to a purchase instruction from a user, so as to determine a target cabinet 300 accommodating the target item and determine a target conveying device 400, and control the target conveying device 400 to acquire the target item from the target cabinet 300 and to convey the acquired target item to the receiving area 230 of the target vending device 200. The user can directly take the item in the receiving area 230 out through the pickup port 220 of the target vending device 200. Therefore, when purchasing an item from the intelligent vending station 010 in this embodiment, the user can take the item to be purchased directly out from the pickup port 220 of the vending device 200 only by selecting the item on the human-computer interaction device 210 of the vending device 200, thus avoiding the user from turning round and round between multiple cabinets and saving the time of the user spent in shopping.

Figure 9:
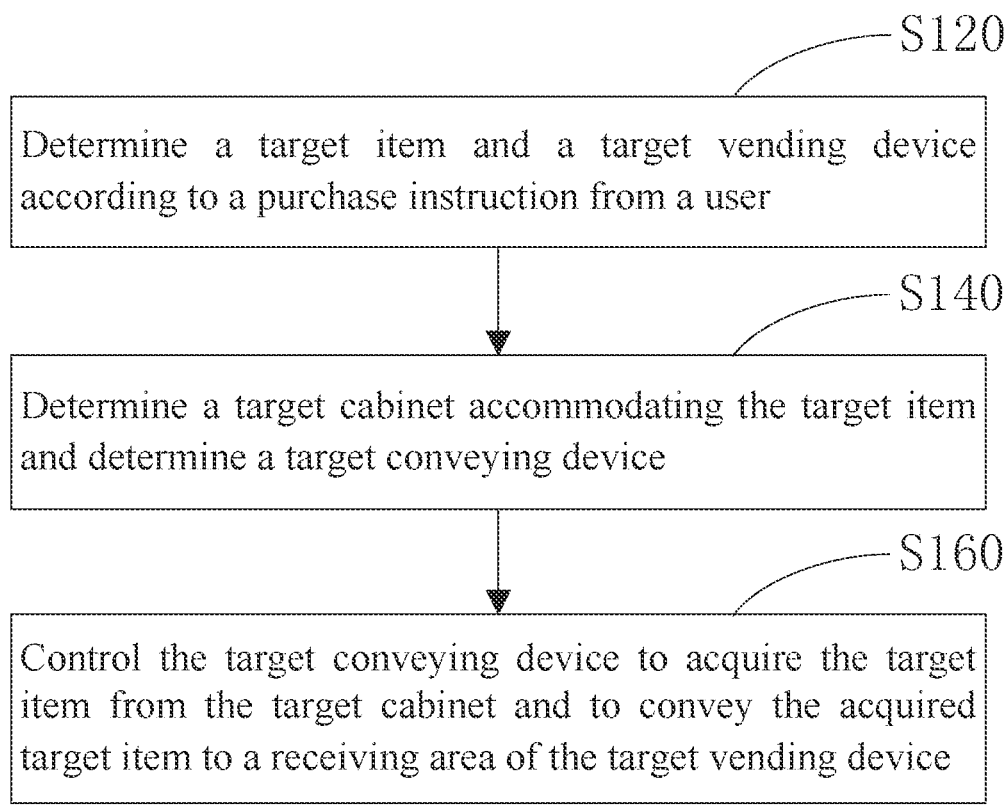
FIG. 9 is a flow chart of a vending method of the intelligent vending station according to an embodiment of the present disclosure.

FIG. 9 is a flow chart of the vending method of the intelligent vending station according to an embodiment of the present disclosure. Referring to FIG. 9, the vending method of the intelligent vending station in this embodiment can be implemented by the intelligent vending station 010 according to the embodiments of the present disclosure, which includes steps S120 to S160.

In the step S120, a target item and a target vending device are determined according to a purchase instruction from a user.

In a specific implementation process, taking the intelligent vending station 010 according to the embodiments of the present disclosure as an example, the user can browse information about items for sale in the intelligent vending station 010 through the human-computer interaction device 210, and input the purchase instruction through the human-computer interaction device 210. In an embodiment, the purchase instruction input may be a code of an item to be purchased input by the user through the human-computer interaction device 210. In an embodiment, when the human-computer interaction device 210 displays pictures of items available for selection, the purchase instruction input may also be a picture of an item to be purchased selected by the user from the pictures of items displayed by the human-computer interaction device 210. The control device may determine the target item based on the item code input or the item picture selected by the user. In this embodiment, the control device may determine the target vending device by determining the source of the purchase instruction, for example by determining the vending device 200 corresponding to the human-computer interaction device 210 sending the purchase instruction as the target vending device.

In other embodiments provided in the present disclosure, the user may also select an item and input a purchase instruction through a mobile terminal, and the mobile terminal transmits the purchase instruction input by the user to the control device through communication means such as network, Bluetooth and so on. In one or more embodiments, in this case, the user may designate the vending device 200 from which the item is taken out through the mobile terminal and send an identification of the designated vending device 200 to the control device, so that the control device can determine the target vending device 200 based on the identification received.

In the step S140, a target cabinet accommodating the target item and a target conveying device are determined.

In a specific implementation process, taking the intelligent vending station 010 according to the embodiments of the present disclosure as an example, a correspondence between an item and its position information may be pre-stored in a memory, and the position information includes a position of a cabinet accommodating the item and a position of an item column in the cabinet accommodating the item. The control device may retrieve a position or number of the target cabinet 300 accommodating the target item in the memory according to the target item, and retrieve a number of a target item column 321 accommodating the target item. The control device may also be configured to determine the conveying device 400, i.e., the target conveying device, for conveying the target item. In an embodiment of the present disclosure, the conveying device closest to the target cabinet 300 may be selected as the target conveying device 400.

In the step S160, the target conveying device is controlled to acquire the target item from the target cabinet and to convey the acquired target item to the receiving area of the target vending device.

In a specific implementation process, taking the intelligent vending station 010 according to the embodiments of the present disclosure as an example, the control device can control the target conveying device 400 to move to the position of the target cabinet 300, acquire the target item from the target cabinet 300, and then convey the target item to the receiving area 230 of the target vending device 200.

In this embodiment, after the step S160, the method further includes the following steps of controlling a receiving platform 231 to receive the target item conveyed by the target conveying device 400 at a receiving position, and then controlling the receiving platform 231 to move to a dispensing position for the user to take the target item on the receiving platform 231 out. In an embodiment, the vending method further includes a step of controlling a gate 221 to open the pickup port 220 of the target vending device 200 after the target item is conveyed to the pickup area 230 of the target vending device 200. In an embodiment of the present disclosure, the target vending device 200 includes a plurality of pickup ports 220. The step of controlling the gate 221 to open the pickup port 220 of the target vending device 200 may include the following steps of: determining the position of the target item in the receiving area 230 of the target vending device 200, determining the pickup port 220 corresponding to the target item based on the position of the target item, and controlling the gate 221 to open the pickup port 220 of the target vending device 200 corresponding to the target item for the user to take the target item out.

According to the vending method of the intelligent vending station in this embodiment, the target cabinet 300 can be determined from a plurality of cabinet 300 according to a purchase instruction, and the target item of the target cabinet 300 can be conveyed to the receiving area 230 of the vending device 200 through the conveying device 400, so that the user can directly take the item in the receiving area 230 out through the pickup port 220 of the vending device 200. Therefore, when purchasing an item from the intelligent vending station 010, the user can take the item to be purchased directly out from the pickup port 220 of the vending device 200 only by selecting the item on the human-computer interaction device 210 of the vending device 200, thus avoiding the user from turning round and round between 300 cabinets, saving the time of the user spent in shopping, and improving the problem that users spend a long time shopping in supermarkets.

In an embodiment based on the embodiment shown in FIG. 9, when a plurality of target items are determined according to the purchase instructions of the user in the step S120, the steps S140 and S160 can be performed as follows.

The step S140 of determining the target conveying device includes a step of determining one target conveying device 400.

The step S160 includes the following steps of: determining whether the target conveying device 400 can convey the target items at one time from the target cabinet 300 to the receiving area 230 of the target vending device 200 or not, and if not, controlling the target conveying device 400 to convey the target items multiple times from the target cabinet 300 to the receiving area 230 of the target vending device 200. In this way, by determining that one target conveying device 400 conveys the target items multiple times, it is possible to effectively ensure that all the target items are conveyed to the receiving area 230, and avoid the losses to the user caused by incomplete pickups due to insufficient capacity of the conveying device 400.

In an embodiment, the step S140 of determining the target conveying device includes a step of determining a plurality of target conveying devices 400.

The step S160 includes the following steps of: determining the target items corresponding to each target conveying device 400, and controlling each target conveying device 400 to convey the corresponding target items from the target cabinet 300 to the receiving area 230 of the target vending device 200.

In an embodiment, in the process of determining the target items corresponding to each target conveying device 400, the corresponding target items are first allocated to one target conveying device 400, and then to the next target conveying device 400 when the volume or quantity of the target items allocated to the previous target conveying device 400 reaches the maximum capacity of this target conveying device 400. Using a plurality of target conveying devices 400 to convey a plurality of target items can greatly improve the dispensing efficiency and save the time of the user spent in shopping.

In an embodiment, when a plurality of target items are determined according to the purchase instruction from the user, the step S140 of determining the target cabinet accommodating the target items includes a step of determining the target cabinet 300 corresponding to each target item.

In an embodiment, the step S160 of controlling the target conveying device to acquire the target item from the target cabinet includes the following steps of: determining whether there is more than one target cabinet 300 or not, if not, determining a delivery sequence of a plurality of target conveying devices 400 based on the position of each target conveying device 400 and the position of the target cabinet 300 when the plurality of target conveying devices 400 are determined, and controlling the plurality of target conveying devices 400 to acquire the target items from the target cabinet 300 in the delivery sequence. For example, the plurality of target conveying devices 400 are sorted based on the distances in ascending order between the target conveying devices 400 and the target cabinet 300, and the target conveying device 400 closer to the target cabinet 300 is controlled to pick up items from the target cabinet 300 first according to this sorting order, so that the efficiency of conveying the target items can be improved.

In an embodiment, the step S160 of controlling the target conveying device to acquire the target item from the target cabinet includes the following steps of: determining whether there is more than one target cabinet 300 or not, if so, determining a travel path of a target conveying device 400 based on the position of the target conveying device 400 and the position of each target cabinet 300 when the target conveying device 400 is determined, and controlling the target conveying device 400 to acquire the target items from the plurality of target cabinets 300 in sequence along the travel path. In this way, the target conveying device 400 acquires all the target items from each target cabinet 300 and then conveys the acquired target items to the receiving area 230 of the target vending device 200, which improves the efficiency of conveying the target items.

In an embodiment, the step S160 of controlling the target conveying device to acquire the target item from the target cabinet includes the following steps of: determining whether there is more than one target cabinet 300 or not; if so, determining a correspondence between a plurality of target conveying devices 400 and a plurality of target cabinets 300 based on the position of each target conveying device 400 and the position of each target cabinet 300 when the plurality of target conveying devices 400 are determined, and controlling each target conveying device 400 to acquire the target items from the corresponding target cabinet 300. For example, a target conveying device 400 closer to a target cabinet 300 is determined as the target conveying device corresponding to the target cabinet 300. In this way, the target items accommodated in the plurality of target cabinets 300 can be conveyed by the plurality of target conveying devices 400 at the same time, which improves the efficiency of conveying the target items.

In an embodiment of the present disclosure, the step S120 may include the following steps of: determining a plurality of target items and a plurality of target vending devices 200 according to purchase instructions from a plurality of users, and determining a correspondence between the target items and the target vending devices 200. When the plurality of target items correspond to the plurality of users, the step S160 may include a step of controlling the target conveying device 400 to acquire the target items for the plurality of users from the target cabinet 300 and to convey each target item to the receiving areas 230 of the corresponding target vending devices 200 in sequence. In this way, the target items to be purchased by the plurality of users may be taken out in one pickup process and conveyed to the receiving area 230 of the vending device 200 corresponding to each user, thereby improving the dispensing efficiency of the intelligent vending station.

Figure 10:
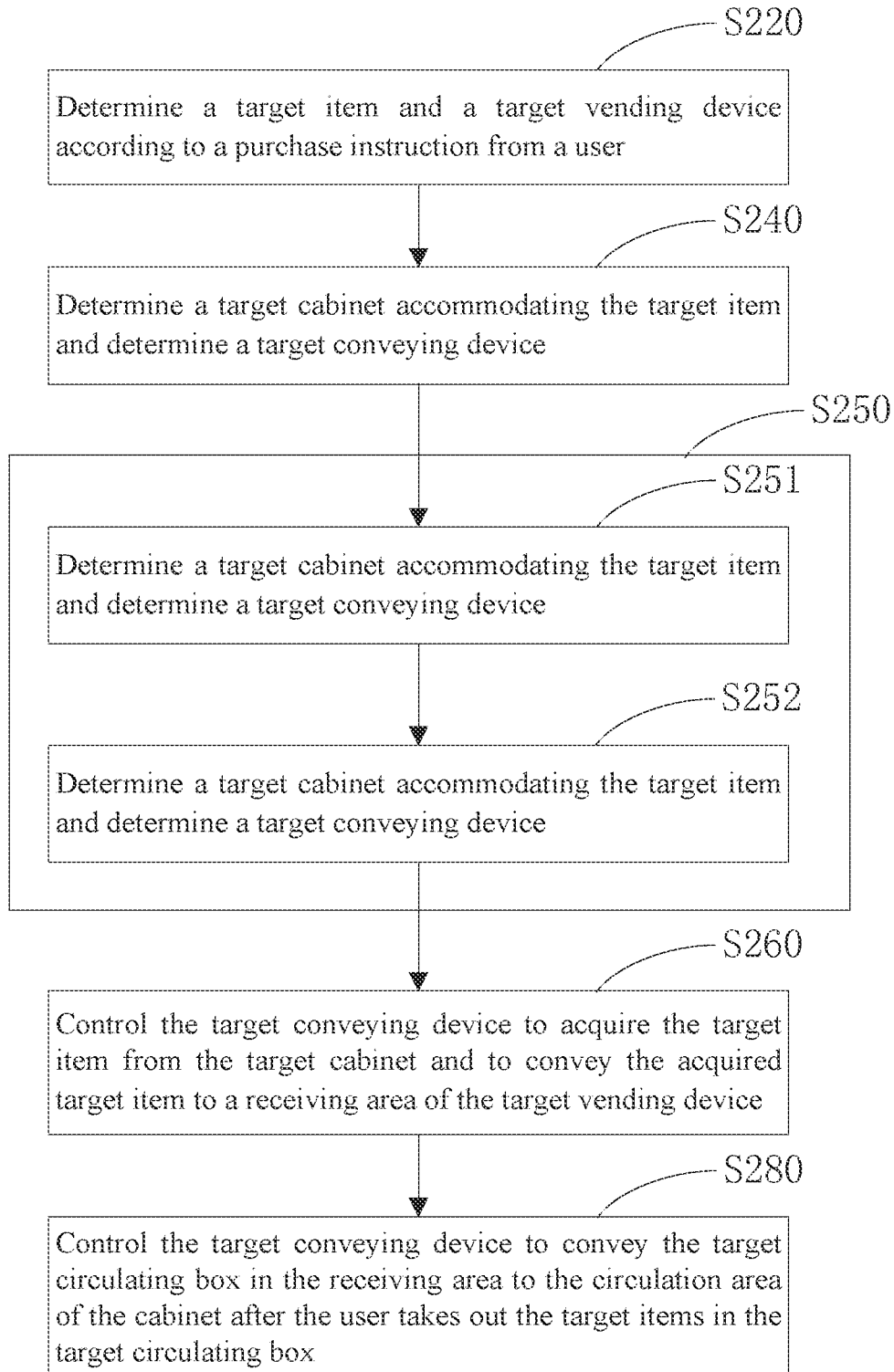
FIG. 10 is a flow chart of a vending method of the intelligent vending station according to another embodiment of the present disclosure.

FIG. 10 is a flow chart of a vending method of the intelligent vending station according to another embodiment of the present disclosure. The vending method according to this embodiment may be regarded as an alternative implementation way of the vending method according to the embodiment in FIG. 9. Referring to FIG. 10, the vending method of the intelligent vending station in this embodiment includes steps S220 to S280.

In the step S220, a target item and a target vending device are determined according to a purchase instruction from a user.

It should be noted that the step S220 is the same as the step S120.

In the step S240, a target cabinet accommodating the target item and a target conveying device are determined.

It should be noted that the step S240 is the same as the step S140.

In the step S250, the delivery device of the target cabinet is controlled to deliver the target item from the storage area of the target cabinet to the circulation area of the target cabinet.

In a specific implementation process, taking the intelligent vending station 010 according to the embodiments of the present disclosure as an example, the control device controls the vertical driving mechanism and the horizontal driving mechanism to drive the hopper 330 to a position corresponding to the item column 321 (i.e., the target item column) where the target item is located. Then, the push plate driving mechanism 333 is controlled to drive the push plate 322 to push the target item into the hopper 330. The hopper 330 is then driven to a position over the circulation area 340 and put the target item into the circulation area 340. In this embodiment, the step S250 includes steps S251 and S252.

In the step S251, a target circulating box in the circulation area of the target cabinet is determined.

In the step S252, the delivery device of the target cabinet is controlled to deliver the target item from the storage area of the target cabinet to the target circulating box of the target cabinet.

In a specific implementation process, taking the intelligent vending station 010 according to the embodiments of the present disclosure as an example, the steps S251 and S252 are both implemented by the control device. A vacant circulating box 342 in the circulation area 340 may be detected by a detection device (such as a sensor) and then determined as the target circulating box 342, the hopper 330 is controlled to acquire the target item and to move above the target circulating box 342, and then the receiving bin 332 is controlled to turn over (or the bottom plate 335 of the hopper 330 is controlled to open) so that the target item in the hopper 330 can be dropped directly into the vacant circulating box 342.

In the step S260, the target conveying device is controlled to acquire the target circulating box of the target cabinet and to convey the target circulating box to the receiving area of the target vending device.

In a specific implementation process, taking the intelligent vending station 010 according to the embodiments of the present disclosure as an example, the control device may control the conveying device 400 to move to a position corresponding to the target cabinet 300, make the pickup platform 430 face towards the target circulating box 342, and then drive the forks 432 on the pickup platform 430 to pick up the target circulating box 342. After that, the conveying device 400 moves to a position corresponding to the receiving area 230, and the pusher 442 is controlled to push the circulating box 342 together with the target item to the receiving area 230 of the vending device 200. In the intelligent vending station 010 according to the embodiments of the present disclosure, the vending device 200 further includes a receiving platform 231 which is provided in the receiving area 230 and configured to move up and down in the receiving area 230. The receiving platform 231 may be located at a receiving position or at a dispensing position which is located above the receiving position and close to the pickup port 220. The target item first arrives on the receiving platform 231 when it enters the receiving area 230. Therefore, after the step S260, the method further includes the following steps of: controlling the receiving platform 231 to receive the target item conveyed by the target conveying device 400 at the receiving position, and then controlling the receiving platform 231 to move to the dispensing position. In one or more embodiments, the receiving platform 231 can receive a plurality of items purchased by the user, and then move to the dispensing position together with the plurality of items for the user to take the items out at one time, thus reducing the frequent pickup operations of the user. In one or more embodiments, there may be one or more target items accommodated in each circulating box 342.

In the step S280, after the user takes the target items in the target circulating box out, the conveying device is controlled to convey the target circulating box in the receiving area to the circulation area of the cabinet.

In a specific implementation process, taking the intelligent vending station 010 according to the embodiments of the present disclosure as an example, the control device controls the conveying device 400 to convey the target circulating box 342 in the receiving area 230 to the circulation area 340 of the cabinet 300 after the user takes out the target items in the target circulating box 342, so as to fully recycle the circulating boxes 342. In this process, the conveying device 400 conveying the target circulating box 342 may be any conveying device 400 within the enclosure 100 of the intelligent vending station 010.

The vending method according to this embodiment solves the problem that it is difficult to pick up items of varying sizes and specifications. Firstly, conveying the target item to the target circulating box in the circulation area, and then conveying the target circulating box accommodating the target item by using the conveying device to the receiving area of the target vending device for users to take the item out, thus improving the stability in conveying items.

Figure 11:
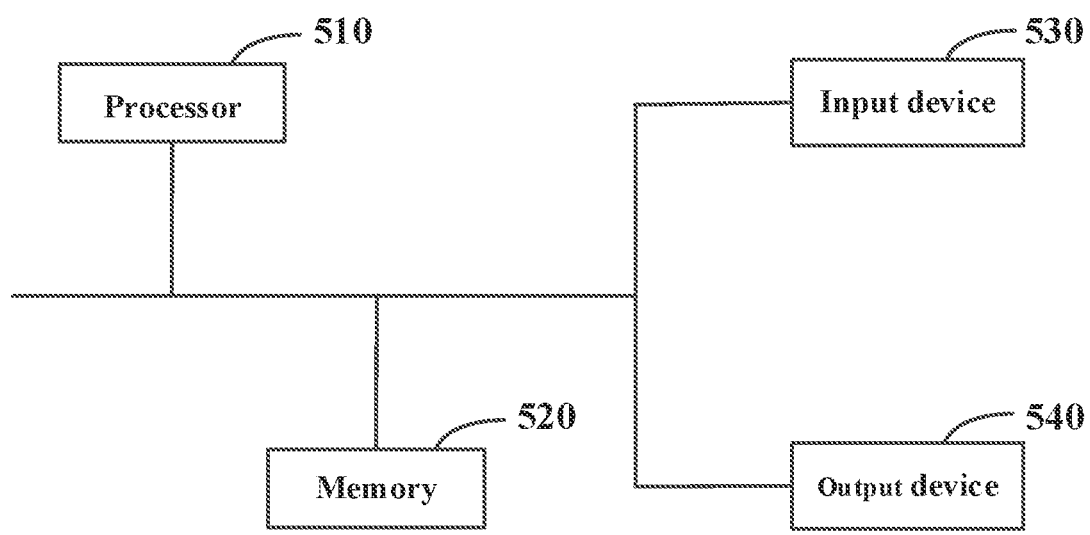
FIG. 11 is a structural schematic view of an electronic device according to an embodiment of the present disclosure.

FIG. 11 is a structural schematic view of an electronic device according to an embodiment of the present disclosure. As shown in FIG. 11, the electronic device includes one or more processors 510 and a memory 520. An example of one processor 510 is shown in FIG. 11.

The electronic device may further include an input device 530 and an output device 540.

The processor 510, the memory 520, the input device 530, and the output device 540 in the electronic device may be connected by a bus or other means, and an example of bus connection is shown in FIG. 11.

As a computer-readable storage medium, the memory 520 may be configured to store software programs, computer-executable programs, and modules. The processor 510 executes various functional applications and data processing by running software programs, instructions and modules stored in the memory 520, so as to implement any one of the methods in the above embodiments.

The memory 520 may include a program storage area and a data storage area, where the program storage area may store application programs required for an operating system and for at least one function, and the data storage area may store data created according to the use of the electronic device. In addition, the memory may include volatile memory such as Random Access Memory (RAM), and may also include non-volatile memory such as at least one disk memory, a flash memory, or other non-transient solid-state memories.

The memory 520 may be a non-transient computer storage medium or a transient computer storage medium. The non-transient computer storage medium includes, for example, at least one disk memory, a flash memory, or other non-volatile solid-state memories. In an embodiment, the memory 520 may alternatively include memories remotely located with respect to the processor 510, and these remote memories may be connected to the electronic device through a network. Examples of the above network may include the Internet, an intranet, a local area network, a mobile communication network, and combinations thereof.

The input device 530 may be configured to receive numeric or character information input and to generate key signal inputs relating to user settings and function control of the electronic device. The output device 540 may include a display screen and other display devices.

According to this embodiment, a computer-readable storage medium storing computer-executable instructions for performing the above method is further provided.

All or part of the processes in the method according to the above embodiments may be implemented by executing related hardware with a computer program. The program may be stored in a non-transient computer-readable storage medium, and when executed, may include the processes of the above method in the embodiments, where the non-transient computer-readable storage medium may be a magnetic disk, an optical disk, a Read-Only Memory (ROM) or a RAM, etc.

The intelligent vending station, the electronic device and the computer-readable storage medium according to the embodiments of the present disclosure are configured to implement the above vending method and thus have the same beneficial effects.

What is claimed is:

1. A vending method of an intelligent vending station, wherein the intelligent vending station comprises an enclosure, and a plurality of cabinets and at least one conveying device which are provided within the enclosure; each cabinet is configured to accommodate items, at least one vending device, having a pickup port provided on an outer wall of the enclosure and a receiving area provided on an inner wall of the enclosure, is provided on the enclosure, and the receiving area is connected with the pickup port; each conveying device is configured to move within the enclosure, and the vending method of the intelligent vending station comprises the following steps of:
    determining a target item and a target vending device according to a purchase instruction from a user;
    determining a target cabinet accommodating the target item and determining a target conveying device; and
    controlling the target conveying device to acquire the target item from the target cabinet and to convey the acquired target item to the receiving area of the target vending device,
    wherein each vending device further comprises a receiving platform which is provided in the receiving area and configured to move up and down in the receiving area, and the receiving platform is located at a receiving position or at a dispensing position, the vending method of the intelligent vending station further comprises the following steps of:
    controlling the receiving platform of the target vending device to receive the target item conveyed by the target conveying device at the receiving position; and
    controlling the receiving platform to move to the dispensing position, to allow the user to take the target item on the receiving platform out.

2. The vending method of the intelligent vending station of claim 1, wherein each cabinet comprises a circulation area, a storage area and a delivery device, the storage area is configured to accommodate items, and the delivery device is configured to deliver the items in the storage area to the circulation area;
    before the operation of controlling the target conveying device to acquire the target item from the target cabinet, the vending method of the intelligent vending station further comprises a step of:
    controlling the delivery device of the target cabinet to deliver the target item from the storage area of the target cabinet to the circulation area of the target cabinet;

the operation of controlling the target conveying device to acquire the target item from the target cabinet comprises a step of:
controlling the target conveying device to acquire the target item from the circulation area of the target cabinet.

3. The vending method of the intelligent vending station of claim 2, wherein a plurality of circulating boxes each configured to receive items are provided in each cabinet;
the operation of controlling the delivery device of the target cabinet to deliver the target item from the storage area of the target cabinet to the circulation area of the target cabinet comprises the following steps of:
determining a target circulating box in the circulation area of the target cabinet; and
controlling the delivery device of the target cabinet to deliver the target item from the storage area of the target cabinet to the target circulating box.

4. The vending method of the intelligent vending station of claim 3, wherein the operation of controlling the target conveying device to acquire the target item from the target cabinet and to convey the acquired target item to the receiving area of the target vending device comprises a step of:
controlling the target conveying device to acquire the target circulating box of the target cabinet and to convey the target circulating box to the receiving area of the target vending device.

5. The vending method of the intelligent vending station of claim 1, wherein each vending device further comprises a gate configured to close or open the pickup port;
after the operation of controlling the target conveying device to acquire the target item from the target cabinet and to convey the acquired target item to the receiving area of the target vending device, the vending method of the intelligent vending station further comprises a step of:
controlling the gate to open the pickup port of the target vending device.

6. The vending method of the intelligent vending station of claim 1, wherein
the operation of determining the target item according to the purchase instruction from the user comprises a step of: determining a plurality of target items according to the purchase instruction from the user;
the operation of determining the target conveying device comprises a step of: determining one target conveying device;
the operation of controlling the target conveying device to acquire the target items from the target cabinet and to convey the acquired target items to the receiving area of the target vending device comprises the following steps of: determining whether the target conveying device can convey the target items at one time from the target cabinet to the receiving area of the target vending device or not, and if not, controlling the target conveying device to convey the target items multiple times from the target cabinet to the receiving area of the target vending device.

7. The vending method of the intelligent vending station of claim 1, wherein
the operation of determining the target item according to the purchase instruction from the user comprises a step of: determining a plurality of target items according to the purchase instruction from the user;

the operation of determining the target conveying device comprises a step of: determining a plurality of target conveying devices;
the operation of controlling the target conveying device to acquire the target items from the target cabinet and to convey the acquired target items to the receiving area of the target vending device comprises the following step of: determining the target items corresponding to each target conveying device, and controlling each target conveying device to convey the corresponding target items from the target cabinet to the receiving area of the target vending device.

8. The vending method of the intelligent vending station of claim 1, wherein
the operation of determining the target item according to the purchase instruction from the user comprises a step of: determining a plurality of target items according to the purchase instruction from the user;
the operation of determining the target conveying device comprises a step of: determining a plurality of target conveying devices;
the operation of determining the target cabinet accommodating the target items comprises a step of: determining the target cabinet corresponding to each target item;
the operation of controlling the target conveying device to acquire the target item from the target cabinet comprises the following steps of:
determining whether there is more than one target cabinet or not;
if not, determining a delivery sequence of the plurality of target conveying devices based on the position of each target conveying device and the position of the target cabinet, and controlling the plurality of target conveying devices to acquire the target items from the target cabinet in the delivery sequence.

9. The vending method of the intelligent vending station of claim 1, wherein
the operation of determining the target item according to the purchase instruction from the user comprises a step of: determining a plurality of target items according to the purchase instruction from the user;
the operation of determining the target conveying device comprises a step of: determining one target conveying device;
the operation of determining the target cabinet accommodating the target items comprises the following steps of: determining the target cabinet corresponding to each target item;
the operation of controlling the target conveying device to acquire the target item from the target cabinet comprises the following steps of:
determining whether there is more than one target cabinet or not;
if so, determining a travel path of the target conveying device based on the position of the target conveying device and the position of each target cabinet, and controlling the target conveying device to acquire the target items from the plurality of target cabinets in sequence along the travel path.

10. The vending method of the intelligent vending station of claim 1, wherein
the operation of determining the target item according to the purchase instruction from the user comprises a step of: determining a plurality of target items according to the purchase instruction from the user;

the operation of determining the target conveying device comprises a step of: determining a plurality of target conveying devices;

the operation of determining the target cabinet accommodating the target items comprises a step of: determining the target cabinet corresponding to each target item;

the operation of controlling the target conveying device to acquire the target item from the target cabinet comprises the following steps of:

determining whether there is more than one target cabinet or not;

if so, determining a correspondence between the target conveying devices and the target cabinets based on the position of each target conveying device and the position of each target cabinet, and controlling each target conveying device to acquire the target items from the corresponding target cabinet.

11. The vending method of the intelligent vending station of claim 1, wherein the operation of determining the target item and the target vending device according to the purchase instruction from the user comprises the following steps of: determining a plurality of target items and a plurality of target vending devices based on purchase instructions from a plurality of users, and determining a correspondence between the target items and the target vending devices;

the operation of controlling the target conveying device to acquire the target item from the target cabinet and to convey the acquired target item to the receiving area of the target vending device comprises the following step of: controlling the target conveying device to acquire the target items for the users from the target cabinet and to convey the target items in sequence to the receiving area of the corresponding target vending device.

12. An intelligent vending station, comprising a control device, an enclosure, as well as a plurality of cabinets and at least one conveying device which are provided within the enclosure; each cabinet is configured to accommodate a plurality of items, at least one vending device, having a pickup port provided on an outer wall of the enclosure and a receiving area provided on an inner wall of the enclosure, is provided on the enclosure, and the receiving area is connected with the pickup port; each conveying device is configured to move within the enclosure and electrically connected with the control device, and the control device is configured to:

determine a target item and a target vending device according to a purchase instruction from a user, determine a target cabinet accommodating the target item and determine a target conveying device, and control the target conveying device to acquire the target item from the target cabinet and to convey the acquired target item to the receiving area of the target vending device, wherein each vending device further comprises a receiving platform which is provided in the receiving area and configured to move up and down in the receiving area, and the receiving platform is located at a receiving position or at a dispensing position, the control device is further configured to:

control the receiving platform of the target vending device to receive the target item conveyed by the target conveying device at the receiving position; and control the receiving platform to move to the dispensing position, to allow the user to take the target item on the receiving platform out.

13. The intelligent vending station of claim 12, wherein the conveying device is a conveying vehicle or a robot.

14. An electronic device, comprising:

at least one processor, and a memory configured to store at least one program, at least one program is executed by at least one processor, enabling at least one processor to implement a vending method of an intelligent vending station, wherein the intelligent vending station comprises an enclosure, and a plurality of cabinets and at least one conveying device which are provided within the enclosure; each cabinet is configured to accommodate items, at least one vending device, having a pickup port provided on an outer wall of the enclosure and a receiving area provided on an inner wall of the enclosure, is provided on the enclosure, and the receiving area is connected with the pickup port; each conveying device is configured to move within the enclosure, and the vending method of the intelligent vending station comprises the following steps of:

determining a target item and a target vending device according to a purchase instruction from a user;

determining a target cabinet accommodating the target item and determining a target conveying device; and controlling the target conveying device to acquire the target item from the target cabinet and to convey the acquired target item to the receiving area of the target vending device, wherein each vending device further comprises a receiving platform which is provided in the receiving area and configured to move up and down in the receiving area, and the receiving platform is located at a receiving position or at a dispensing position, the vending method of the intelligent vending station further comprises the following steps of:

controlling the receiving platform of the target vending device to receive the target item conveyed by the target conveying device at the receiving position; and controlling the receiving platform to move to the dispensing position, to allow the user to take the target item on the receiving platform out.

* * * * *